Aug. 16, 1938. R. A. BOERSMA 2,127,200
ACCELERATOR PEDAL
Filed Nov. 29, 1937

Inventor
Reemer A. Boersma
By Livermore and
Van Antwerp
Attorneys

Patented Aug. 16, 1938

2,127,200

UNITED STATES PATENT OFFICE 2,127,200

ACCELERATOR PEDAL

Reemer A. Boersma, Holland, Mich., assignor to Duffy Manufacturing Company, Holland, Mich., a corporation of Michigan Application November 29, 1937, Serial No. 176,968

4 Claims. (Cl. 74—513)

This invention relates generally to the method of manufacturing a composite rubber and metal article and more particularly to a foot or accelerator pedal.

Briefly described, my article of manufacture consists of an accelerator pedal having a novelly constructed bearing member, of extremely long life, at one end and an integrally formed combined universal joint and stop adjacent its other end.

One of the objects of my invention is to provide a foot pedal construction with a pivoted support which will not only be long lived but which will maintain its lubrication and hence give to the foot pedal a uniform, smooth and easy operation for substantially the life of the automobile.

Another feature lies in the addition of a fabric member between the graphite bearing member and the metal reinforcing sleeve therearound whereby a friction fit is obtained.

Furthermore, this friction fit is augmented by the rubber composition which is forced through the openings in the sheet metal sleeve and integrally attached to the graphite impregnated fabric.

Another feature of my invention lies in the elimination of any holding means between the ends of the bearing member, formed of compressed graphite, and the sheet metal sleeve surrounding the same. Thus it is possible to use axially movable clamps adjacent the ends of the sleeve. Perforations through the sleeve, through which the rubber flows, permits an attachment between the sleeve and the composition body of the article.

Another feature is the provision of openings through the metal body immediately under the universal joint projection whereby there is is no play between the joint and the body during retraction of the body.

Another feature is the long rubber portion surrounding and partly forming the universal joint, this being compressed during maximum depression of the pedal, and providing an extremely quick acting return means for the pedal at this range.

Other advantages will appear as the description proceeds.

In the drawing.

Like numerals refer to like parts throughout the several views.

Figure 1:
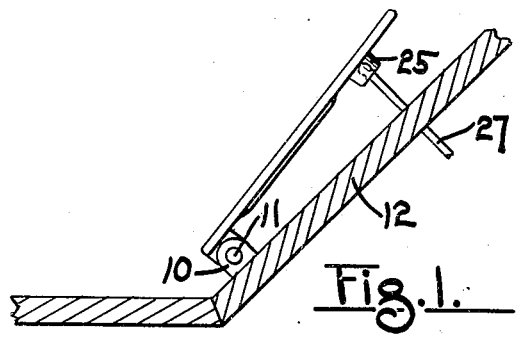
Fig. 1 is a sectional view through the floor of an automobile showing my invention attached thereto.
Figure 2:
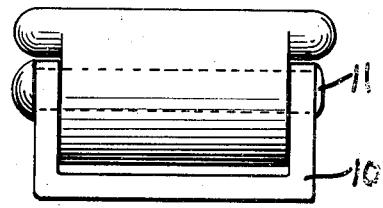
Fig. 2 is an end view of Fig. 1.

Referring to Figs. 1 and 2, numeral 10 indicates a U-shaped supporting bracket having a pin 11 extending therethrough. This bracket or base 10 is attached to the inclined floorboard 12 of the automobile, this floorboard having a slot to receive the accelerator rod 27.

Figure 7:
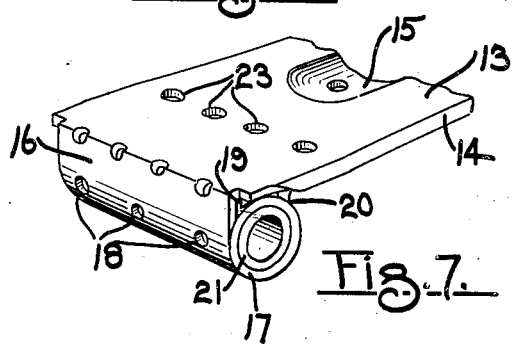
Fig. 7 is a perspective view of the sheet metal reinforcing means.

The metal frame of my improved foot pedal consists of a main body portion 13 having a depending flange 14 extending entirely therearound. The main body portion 13 is substantially co-extensive with the showing of Fig. 3 and is depressed at 15 to reinforce the same. The free or front end of the foot pedal reinforcing is rounded while the other end is bent at right angles as indicated at 16 and is joined onto a metal sleeve 17, this sleeve having holes 18 therein. See Fig. 7. Also, a spacing element 19, see Fig. 5 of the drawing, is provided between the sleeve and the part 13. The opposite side of the sleeve is welded as indicated at 20.

A compressed and hardened graphite sleeve 21, having a fabric 22 embedded upon its outer surface, the diameter of this being approximately equal to the inner diameter of the reinforcing member 17, is forced inside of the sleeve 17 and is frictionally retained therein. Thus the metal frame and its metal sleeve, with the graphite sleeve therein, may be positioned within a mold, the holding means for the metal structure abutting against the respective ends of the sleeve construction.

Figure 6:
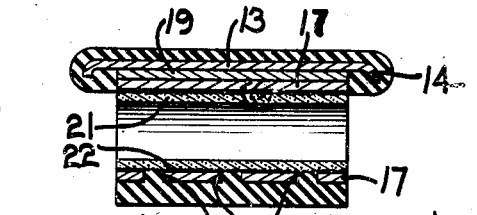
Fig. 6 is a sectional view taken through the cylindrical bearing which is located at one end of the pedal.

Upon the flowing of the rubber into the mold, the rubber surrounds the sheet metal reinforcing and also flows through the holes 18 and joins onto the fabric as shown in Fig. 6 of the drawing. Thus the graphite sleeve is secured in position. Also, holes 23 may be provided through the portion 13 of the reinforcement and the rubber flows through these openings, see Fig. 5 of the drawing, to integrally bond the same thereto.

Figure 3:
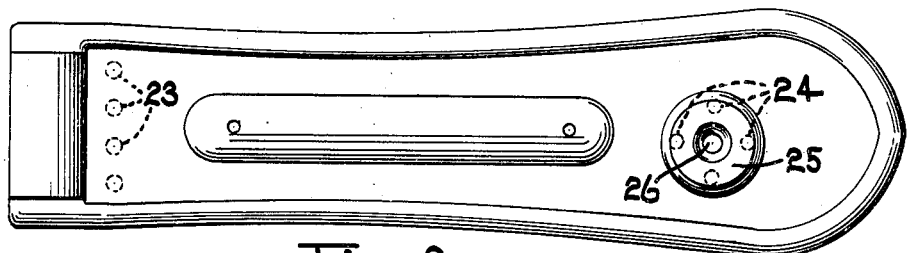
Fig. 3 is an enlarged underplan view of Fig. 1.
Figures 4, 5:
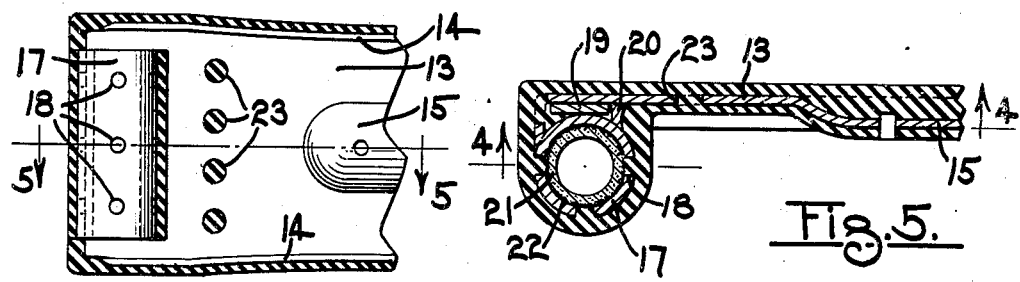
Fig. 4 is a sectional view taken along the line 4—4 of Fig. 5.
Fig. 5 is a sectional view taken along the line 5—5 of Fig. 4.

Also, holes 24, shown in dotted lines in Fig. 3, receive integral necks of rubber, and a bearing member 25, this member, having a recess 26 therein, is formed over these holes. As shown in Fig. 1 of the drawing, the throttle rod 27 is adapted to be received in the undercut opening 26.

Having thus described this invention what I claim as new and desire to secure by Letters Patent is:

1. An article of manufacture of the class described comprising a sheet metal plate having one end bent to form a concentric portion, said concentric portion having holes therein, a graphite sleeve having a roughened exterior surface mounted interiorly of said sleeve and rubber enclosing the sheet metal sleeve on its outer surface, extending through the holes and joined with the roughened surface.

2. A foot pedal construction having a flat portion adapted to receive the operator's foot thereagainst, a rigid shell attached to one end thereof, said shell having holes therein, a graphite bearing located inside of said shell and composition means extending through said holes and bonding against said bearing to prevent movement thereof.

3. In combination, a sheet metal sleeve having a plurality of openings leading radially therethrough, a composite graphite and fabric sleeve with the fabric exterior to the graphite located inside of the said sheet metal sleeve and a rubber body encircling said sheet metal sleeve and having portions extending through said openings and joined to the said fabric to prevent movement of said graphite and fabric sleeve.

4. An article of the type described having a flat metal plate with holes at one end, a perforated sleeve at the other end, a graphite sleeve therein, and rubber covering the exterior of said perforated sleeve and plate and extending through said holes, and joined with said graphite sleeve for preventing movement thereof.

REEMER A. BOERSMA.